United States Patent [19]

Riel

[11] 4,433,021
[45] Feb. 21, 1984

[54] SOUND ATTENUATION SANDWICH PANEL INCLUDING BARRIER MATERIAL FOR CORROSION CONTROL

[75] Inventor: Frank J. Riel, San Diego, Calif.

[73] Assignee: Rohr Industries, Inc., Chula Vista, Calif.

[21] Appl. No.: 421,126

[22] Filed: Sep. 22, 1982

[51] Int. Cl.³ .............................................. B32B 3/12
[52] U.S. Cl. .................................... 428/116; 52/806; 181/292; 428/137
[58] Field of Search ................. 428/116, 120, 73, 119, 428/117, 118, 137; 181/292; 52/806; 156/197–292

[56] References Cited

U.S. PATENT DOCUMENTS

| | | | |
|---|---|---|---|
| 4,242,176 | 12/1980 | Riel | 428/116 R |
| 4,254,171 | 3/1981 | Beggs et al. | 428/116 |
| 4,269,882 | 5/1981 | Carrillo et al. | 428/116 |
| 4,271,219 | 6/1981 | Brown | 428/116 |
| 4,291,079 | 9/1981 | Hom | 428/116 |
| 4,292,356 | 9/1981 | Whitemore et al. | 428/116 |
| 4,294,329 | 10/1981 | Rose et al. | 428/116 X |

*Primary Examiner*—Henry F. Epstein
*Attorney, Agent, or Firm*—Patrick J. Schlesinger; Frank D. Gilliam

[57] ABSTRACT

A layer of non-metallic open weave fabric sandwiched between the perforate sheet and an outer thin sheet of microporous fabric of a broad band noise attenuation panel comprising a cellular core adhesively bonded between a pair of metal facing sheets, one perforate and the other imperforate in order to provide enhanced durability in a severe environment. The microporous fabric is constructed from a metal different from at least the perforated sheet and is adhered to the perforated sheet. A method of manufacture of such panel is disclosed.

14 Claims, 4 Drawing Figures

PREPARING THE COMPONENTS FOR ASSEMBLY

ADHERING TOGETHER THE PERFORATED SHEET, OPEN WEAVE BARRIER MATERIAL AND MICROPOROUS MATERIAL

APPLYING ADHERENTS TO THE PERFORATION EXPOSED SURFACE OF THE COMBINED PERFORATE SHEET, OPEN WEAVE BARRIER MATERIAL AND MICROPOROUS MATERIAL, AND TO ONE SURFACE OF THE IMPERFORATE SHEET

STACKING THE COMPONENTS IN ASSEMBLY ORDER

APPLYING PRESSURE TO THE OUTER SURFACES OF THE STACKED COMPONENTS

CURING THE ADHESIVES IN A CONVENTIONAL MANNER

*FIG. 4*

SOUND ATTENUATION SANDWICH PANEL INCLUDING BARRIER MATERIAL FOR CORROSION CONTROL

BACKGROUND OF THE INVENTION

This invention relates to an improvement in acoustic materials and more specifically, but not by way of limitation, to structural attenuation sandwich panels used as high speed air and gas flow surfaces of high-speed aircraft.

In the design and manufacture of sound attenuation panels having structural integrity for use in severe environments, it has been common practice to provide structure with honeycomb core material sandwiched between a perforate and imperforate sheet of material with an exposed fibrous material overlay on the outer surface of the perforated sheet. Sound attenuation panels of this type are taught by U.S. Pat. Nos. 4,242,176; 4,254,171; 4,269,882; 4,271,219; 4,291,079; 4,292,356; and 4,294,329, all of which are assigned to the assignee of the instant invention. Throughout these various patents, it is taught that a layer of adhesive isolates the perforated sheet from the porous layer overlay to prevent galvanic action therebetween when the perforated sheet and porous material are constructed of dissimilar metals. This method of isolation works well; however, it has been discovered that the thickness and the required even distribution of this layer of adhesive, even under strict quality control, is not always predictable and in some instances, the completed panel lacks complete isolation between the perforated sheet and porous material. This generation of unsatisfactory material increases the economic cost of the material. It has also been discovered in some instances that the adhesive layer isolation in some of the initially satisfactory appearing panel material has broken down after a period of use thereby requiring "on site" replacement of the failed panels. On site replacement requires that the panel be removed from the aircraft and a new panel installed. This effort is quite costly both in terms of aircraft down time and economic costs.

There has not been a completely satisfactory resolution to the initial and use isolation breakdown in this type of material until the emergence of the instant invention.

SUMMARY OF THE INVENTION

The invention includes a unique sound suppression panel utilizing the Helmholtz resonance principle and a manufacturing method for such panel wherein a sandwich structure is layered as follows: A first layer of an imperforate facing sheet constructed of a material suitable for the intended purpose, generally constructed of aluminum, aluminum alloy or the like; a first cellular core adhesively adhered to the imperforate sheet so that the imperforate sheet forms a closure on one open cell surface thereof; a sheet of perforated material generally aluminum or an alloy thereof adhesively adhered to the cellular core opposite the imperforate sheet, the perforate sheet and cellular core may be constructed of the same material as the perforated or imperforate sheet; a layer of open weave, non-metallic material adhesively adhered to the perforation exposed surface of the perforated sheet; and a thin sheet of microporous material, having pores in the size range of from 5 to 50 microns constructed of a metal different from at least the perforated sheet, is adhered to the surface of open weave non-metallic material opposite the perforated sheet adhered surface.

An object of this invention is to provide sound attenuation material that reduces turbine engine noise and which has the necessary strength of construction to be utilized as an integral portion of aircraft structure rather than being used as an addition to existing structure and which is free of galvanic action between adjacent dissimilar metals of construction.

A further object of this invention is to provide a method of manufacture of a sound attenuation panel that reduces scrap of unsatisfactory material to a minimum.

A still further object of this invention is to manufacture a sound attenuation panel which does not fail from normal use.

These and other objects and advantages of the invention will become better understood by reference to the following detailed description when considered with the drawings in which:

BRIEF DESCRIPTION OF THE DRAWINGS

FIG. 4 is a flow chart of the method of manufacture of the unique sound suppression material employing the instant invention.

DETAILED DESCRIPTION OF THE INVENTION

Throughout the figures and description, the same numerals are used to identify the same or similar elements.

Figure 1:
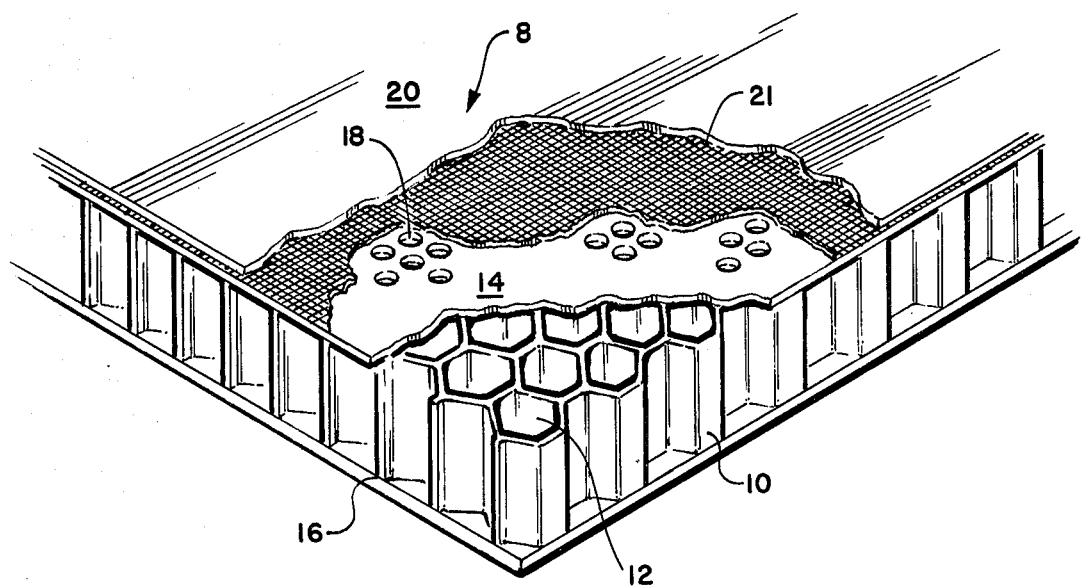
FIG. 1 is a cut-a-way perspective view of an acoustic panel of the instant invention.
Figure 2:
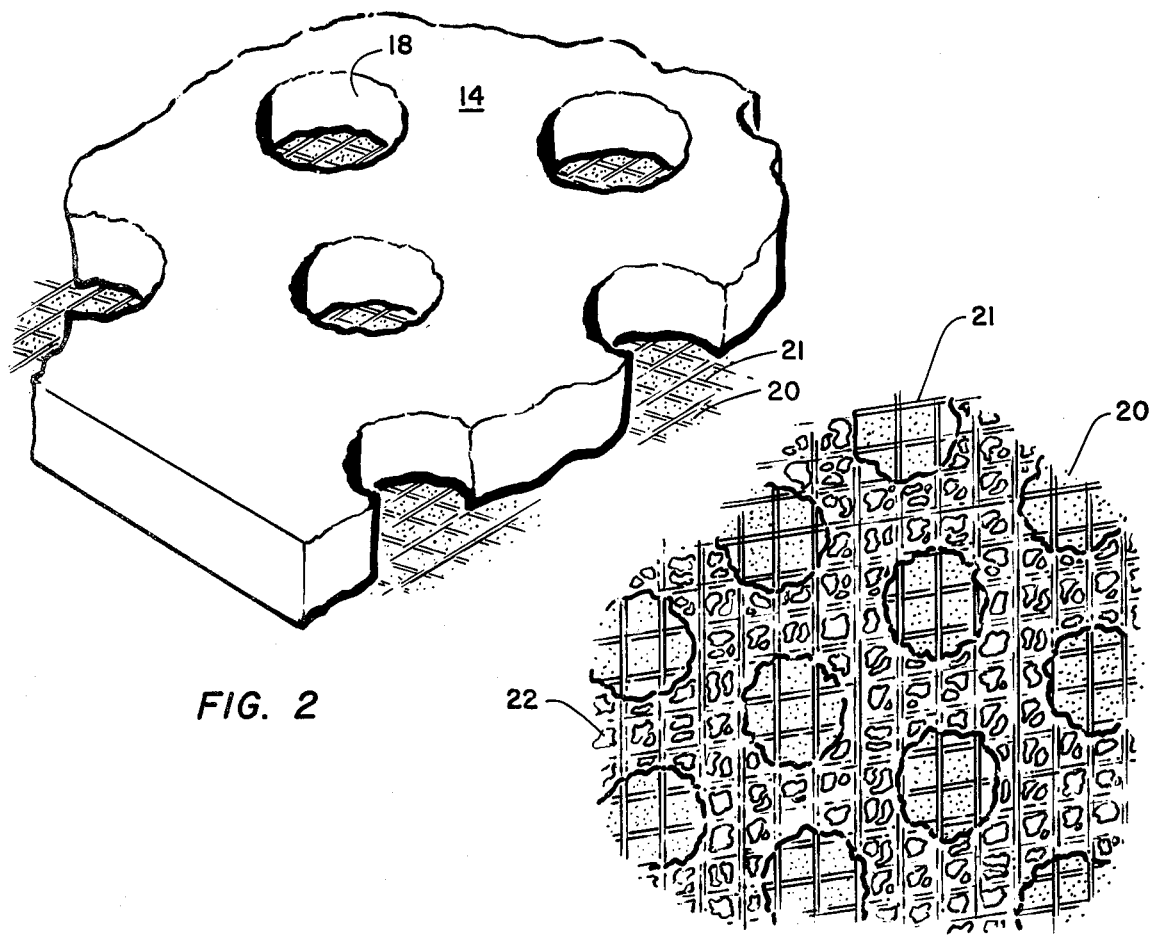
FIG. 2 is an enlarged perspective illustrating the perforated sheet viewed toward the adhered open weave material and microporous material.
Figure 3:
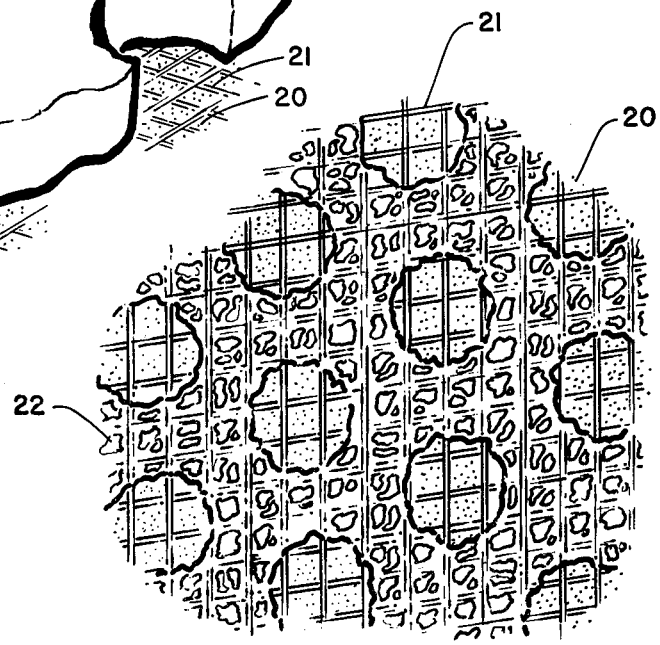
FIG. 3 is a view of FIG. 2 with the perforate sheet peeled therefrom showing the open weave material adhered to the microporous material.

Referring now to drawings in detail, and in particular to FIGS. 1-3, the constituent elements of the honeycomb sandwich panel, generally referred to by the reference numeral 8, of the instant invention comprises a single honeycomb core 10, having a plurality of endwise directed cells 12 and outer facing sheets 14 and 16. The preferred material for the core and facing sheets is aluminum, due to its weight versus strength and economic cost considerations. The facing sheet 14 is provided with a plurality of small apertures or perforations 18; their size, for example, could range from 0.030 to 0.100 inches. The perforations 18 provide a range of from 15% to 36% open area for the facing sheet 14. The perforations 18 may be provided in any satisfactory manner such as by punching, drilling or chem milling through the sheet 14. Various other spacing intervals and patterns may be used to successfully practice this invention. The facing sheet 16 is imperforate and forms one closed surface of the core cells.

A thin sheet 20 of microporous material having pores with a size range of from 5 to 50 microns which provides a relatively smooth air flow surface is adhered to one surface of the perforated sheet 14 with a thin layer of open weave barrier material 21 interposed therebetween. The preferred microporous material 20 is a stainless steel Dutch twill woven material or the like. Other types of material and weave patterns may also be utilized to successfully practice this invention. In some applications of the sound suppression panel, a woven material such as the Dutch twill may require that the strand crossover points be joined by methods well known in the art, such as sintering, diffusion bonding or the like when stainless steel is used.

The open weave barrier material 21 is constructed from a non-metallic thread such as, for example, plastic monofilaments. This barrier material 21 provides for a mechanical spacing between the perforated sheet 14 and the microporous material 20. The predetermined size of the weave openings is such that the flow-through resistance between the outer surface of the microporous material 20 and the core cells does not affect the acoustical properties of the panel 8. It has been found that the spaces between the strands of the barrier material 21 can range from 0.01 inches to 0.02 inches without affecting the acoustical properties of the panel. The ideal space between the strands of the barrier materials is preferably approximately 0.015 inches. It has been found that the diameter of the strands forming the barrier material 21 should be between 75% and 115% of the diameter of the strands forming the microporous material 20. Ideally, the microporous material and the barrier material will be substantially equal. Selection of a barrier material having the above geometry is essential to minimize or eliminate the effect of the barrier material on the flow through resistance. Larger diameter fibers will tend to block some of the openings in the microporous material thereby increasing the flow through resistance and be such that adequate bond strengths may be retained such that the micro-porous material 20 remains adhered to the perforated sheet 14.

The adhesive typically used to bond the imperforate and perforated sheets to the core is preferably a non-solvent type, used for adhesively bonding core to sheets in aerospace applications.

The adhesive 22 typically used to bond the perforated sheet/barrier material/porous material combination is either AF-31 manufactured by the 3M® Company, Metal Bond 4021 manufactured by Narmco, FM-30 manufactured by Bloomingdale Aerospace Products, or an adhesive having the same or similar characteristics.

Generally, but not always, the perforated sheet, the barrier material and the porous material are preassembled, that is, adhered together in a single entity prior to the layer by layer assembly of the panel.

The adhesive coating for bonding the perforated sheet, barrier material and porous material combination is preferably applied by spraying onto one surface of the perforate sheet 14 a thin layer 22 of one of the aforementioned adhesives, the layer 22 consisting of 4 to 6 grams per square foot. Ideally, 5 grams per square foot is utilized. The solvent from the adhesive is then removed by evaporation and the adhesive layer 22 is cured while the constituent elements are under pressure. The pressure and heat for cure may be applied by any convenient means known in this art.

After the combined perforated sheet, barrier layer and microporous material are bonded together and cured, the remaining components are ready to be assembled with the combined perforate sheet, barrier material and microporous material.

A layer of adhesive as aforementioned, is applied to one surface of the imperforate sheet and to the perforation exposed surface of the combined perforated sheet, barrier material and microporous material, or to both faying edges of the honeycomb core. The components are then stacked in the order shown in FIG. 1, namely, the honeycomb core 10 is sandwiched between the imperforate sheet 16 and the perforation exposed surface of the combined perforated sheet 14, barrier material 21 and microporous material 20. After the stacking, pressure is then applied from the now exposed surface of the imperforate sheet and the exposed surface of the microporous material toward the honeycomb core 10. As aforementioned, this pressure can be applied by any convenient means known in the art. The adhesive is allowed to cure in a conventional manner. After curing, the sound suppression panel may be sized to a specific shape as desired.

Although the foregoing invention has been described in some detail by way of illustration and example, for the purpose of clarity of understanding, it should be understood that certain changes and modifications may be practiced within the spirit of the invention as limited only by the scope of the appended claims.

I claim:

1. An acoustic honeycomb sandwich panel having structural integrity for use on and around the high speed air and gas flow surfaces of a high-speed aircraft, comprising:

a honeycomb core having a multiplicity of cells disposed transversely to the panel;

a perforated facing sheet of thin sheet metal bonded to one core face;

an imperforate facing of thin sheet metal bonded to the other core face;

a thin layer of open weave non-metallic fabric providing spacing between the strands of the weave of a predetermined size disposed on substantially the entire surface of said perforated sheet remote from said core; and a thin sheet of microporous metallic fabric constructed of a metal different from said perforated sheet bonded to and covering substantially the entire surface of said perforated sheet remote from said core with said non-metallic fabric sandwiched therebetween, whereby the non-metallic fabric isolates the adjacent sheets and, the flow through air resistance of the microporous fabric and the perforated facing sheet is not affected by the interposition therebetween of said non-metallic fabric.

2. The invention as defined by claim 1 wherein said perforated sheet is made of aluminum and said microporous material is made of steel.

3. The invention as defined in claim 1 wherein the open weave nonmetallic fabric contains between 50–140 threads per square inch.

4. The invention as defined in claim 1 wherein the open weave nonmetallic fabric contains approximately 70 threads per square inch.

5. The invention as defined in claim 1 wherein the threads making up both the nonmetallic fabric and the microporous fabric have substantially the same diameter.

6. The invention as defined in claim 1 wherein said open weave nonmetallic fabric is made from monofilament fibers.

7. The invention as defined in claim 1 wherein said nonmetallic fabric has openings in the range of 5 to 50 microns therethrough.

8. The invention as defined in claim 2 wherein the open weave non-metallic fabric contains between 50–140 threads per square inch.

9. The invention as defined in claim 7 wherein the open weave non-metallic fabric contains between 50-140 threads per square inch.

10. The invention as defined in claim 2 wherein said non-metallic fabric has openings in the range of 5 to 50 microns therethrough.

11. The invention as defined in claim 3 wherein said non-metallic fabric has openings in the range of 5 to 50 microns therethrough.

12. The invention as defined in claim 10 wherein the open weave non-metallic fabric contains between 50-140 threads per square inch.

13. The invention as defined in claim 11 wherein the open weave non-metallic fabric contains between 50-140 threads per square inch.

14. The invention as defined in claim 4 wherein the open weave non-metallic fabric contains between 50-140 threads per square inch.

* * * * *